United States Patent [19]

George et al.

[11] Patent Number: 4,462,416
[45] Date of Patent: Jul. 31, 1984

[54] METHOD AND APPARATUS FOR WASHING DRILLING CUTTINGS

[75] Inventors: James M. George, New Orleans; James D. Smith, Patterson, both of La.

[73] Assignee: Trinol Chemical Corporation, New Orleans, La.

[21] Appl. No.: 375,951

[22] Filed: May 6, 1982

[51] Int. Cl.³ .............................................. B08B 3/00
[52] U.S. Cl. ..................................... 134/104; 134/34
[58] Field of Search ........................ 134/104, 109, 34; 422/281

[56] References Cited

U.S. PATENT DOCUMENTS 3,860,019 1/1975 Teague .............................. 134/109

Primary Examiner—Ferris H. Lander
Attorney, Agent, or Firm—Harvey B. Jacobson

[57] ABSTRACT

A pair of substantially common elevation tank compartments are provided including lower sump portions and a first tank compartment includes an inlet pipe portion for admitting drilling cuttings in a downward direction into the first tank compartment. The inlet pipe portion includes at least one lateral cleaning fluid jet and the first tank compartment includes additional horizontal cleaning fluid jets for directing jets of cleaning fluid through the drilling cuttings as they are admitted into the first tank compartment and subsequently directing jets of cleaning fluid through the cleaning fluid and drilling cuttings within the first tank compartment below the liquid level therein. The upper portion of the second tank compartment includes a vibratory screen-type separator positioned thereover and structure is provided for pumping fluent material from the sump of the first tank compartment to the separator whereby the larger size, cleaned cuttings will be separated from the other fluent material which passes downwardly through the separator and into the cleaning fluid within the second tank compartment. Pump structure is provided for pumping fluent cleaning material from the sump of the second tank compartment to the various aforementioned cleaning fluid jets and a liquid level balance pipe is connected between upper portions of the tank compartments at levels spaced slightly below the liquid levels therein.

4 Claims, 1 Drawing Figure

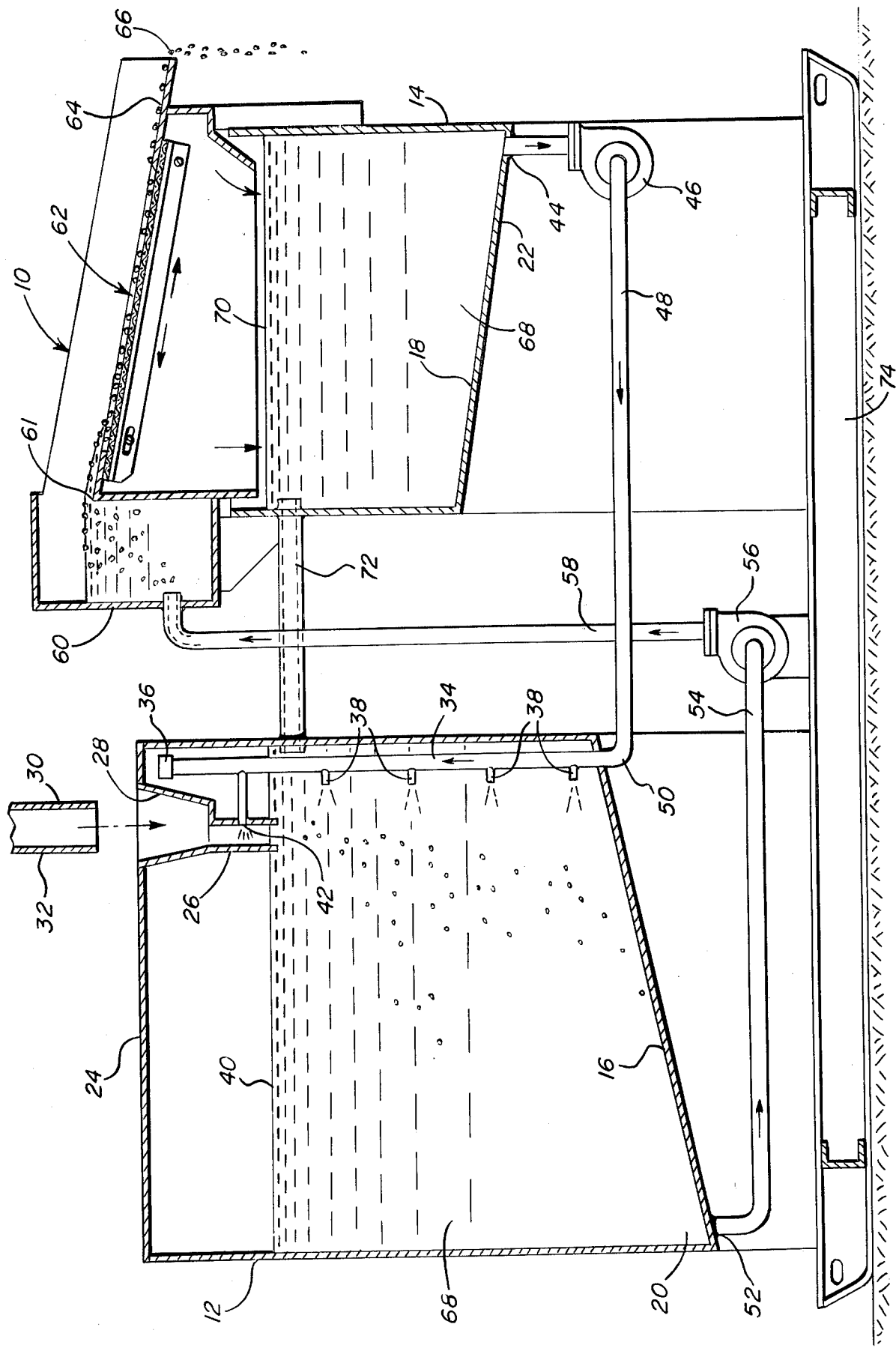

METHOD AND APPARATUS FOR WASHING DRILLING CUTTINGS

BACKGROUND OF THE INVENTION

When an oil base mud is used during a drilling process, the drilling cuttings may not be disposed of until the hydrocarbons therein have been washed from the cuttings. While there have been various methods heretofore proposed for cleaning drilling cuttings, most of these methods and the structures provided for carrying out the methods are very expensive and require considerable maintenance and servicing. Accordingly, a need exists for an improved method and apparatus for cleaning drilling cuttings.

Examples of various forms of cleaning structures, including some of the general structural and operational features of the instant invention are disclosed in U.S. Pat. Nos. 3,693,733, 3,734,776, 3,860,019, 3,901,254 and 4,175,039.

SUMMARY OF THE INVENTION

The drilling cuttings washing apparatus of the instant invention includes a pair of tanks which contain cleaning fluid and which each include lower sump portions. Further, the tanks include a balance pipe or conduit communicating the interior of the tanks at levels spaced slightly below the common liquid levels within the tanks. A first of the tanks includes an inlet conduit through which drilling cuttings to be cleaned may be admitted into the first tank and the inlet conduit includes lateral jet structure supported therefrom for directing at least one jet of cleaning fluid laterally through the drilling cuttings passing through the inlet conduit. In addition, the first tank includes additional jet structure for directing jets of cleaning fluid through the cleaning fluid and drilling cuttings within the first tank below the liquid level thereof and the upper portion of the second tank structure includes a vibratory screen-type separator to which cleaning fluid and drilling cuttings from the sump of the first tank structure are pumped, whereby the cleaned drilling cuttings may be separated from the cleaning fluid. The cleaning fluid which is separated from the drilling cuttings at the vibratory screen-type separator is received in the second tank and the cleaning fluid is pumped from the sump of the second tank to the aforementioned jet structures. In this manner, the cleaning fluid may be used over and over again to clean drilling cuttings before it is necessary to effect a clean-out operation of the sump portions of the tanks and renew the cleaning fluid.

The main object of this invention is to provide a method and apparatus for washing cleaning and separating drilling cuttings.

Another object of this invention is to provide an apparatus which will be capable of carrying out a drilling cuttings washing operation for extended periods of time before it is necessary to effect a clean-out operation and renew a supply of cleaning fluid therein.

Yet another object of this invention is to provide an apparatus which is efficient in operation and of a relatively small size whereby it may be readily skid-mounted.

Still another important object of this invention is to provide a drilling cuttings apparatus constructed in a manner whereby ultimate clean-out operations may be readily carried out.

Another object of this invention is to provide a drilling cuttings cleaner which will require only a single operator to monitor and control the operation thereof.

A final object of this invention to be specifically enumerated herein is to provide an apparatus in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

The drawing comprises a vertical sectional view of the drilling cuttings washer of the instant invention.

DETAILED DESCRIPTION OF THE INVENTION

Referring now more specifically to the drawing, the numeral 10 generally designates the apparatus of the instant invention. The apparatus 10 includes first and second tanks 12 and 14 disposed at substantially the same elevation and the tanks 12 and 14 include inclined bottom walls 16 and 18 defining lower sump portions 20 and 22.

The tank 12 includes a top wall 24 through which a vertical drilling cuttings inlet conduit 26 is secured and the upper end of the conduit 26 includes an enlarged flared inlet portion 28 which opens upwardly toward a closely adjacent outlet end 30 of a drilling cuttings pipe 32 which is operable to vertically downwardly discharge drilling cuttings into the inlet portion 28 of the inlet conduit 26.

A vertically disposed riser pipe 34 is disposed within the tank 12 and includes an upper end closed as at 36. The lower end of the rise pipe 34 is secured through the upper portion of the inclined bottom wall 16 of the tank 12 and the rise pipe 34 includes a plurality of horizontal outlet jet structures 38 spaced below the liquid level 40 within the tank 12 and at least one additional jet structure 42 which opens laterally into the inlet conduit 26.

The sump 22 includes an outlet 44 comprising the inlet for a motor driven pump 46 and the motor driven pump 46 includes an outlet conduit 48 therefor connected to the lower end of the rise pipe 34 as at 50. In addition, the sump 20 includes an outlet 52 connected to the inlet 54 of a second motor driven pump 56 and the pump 56 includes an outlet 58 which opens into a receiving basin 60 supported from the top of the tank 14.

A motor driven vibratory screen-type separator assembly referred to in general by the reference numeral 62 is supported over the upper end of the tank 14 and the upper portion of the receiving basin 60 is operative to discharge fluent material and cuttings over the upper weir defining edge portion 61 of basin 60 downwardly over the inclined separator assembly 62. The larger cuttings move downwardly onto the discharge end 64 of the separator assembly 62 and fall by gravity therefrom at as 66 for collection and ultimate disposal. The cleaning fluid supplied to the separator assembly 62 from the receiving basins 60 falls therefrom downwardly into the tank 14.

The tanks 12 and 14 are filled with cleaning fluid 68 to the level 40 in the tank 12 and a corresponding level 70 in the tank 14, a connecting pipe 72 communicating the interiors of the tanks 12 and 14 at a level spaced slightly below the levels 40 and 70.

The entire apparatus 10 is mounted on a skid assembly 74 whereby it may be carried to a desired location and each of the pumps 46 and 56 may comprise a pair of pumps connected in parallel to the various inlet and outlets therefor whereby failure of one pump may be immediately compensated for by start-up of the adjacent pump and the opening and closing of the necessary valves (not shown). The separator assembly 62 is motor driven by any suitable motor (not shown) and the separator assembly may be of any suitable available type.

In operation, drilling cuttings are discharged into the inlet portion 28 of the inlet conduit 26 and immediately acted upon by a jet of cleaning solution from the jet 42. Thereafter, the partially clean cuttings fall down into the cleaning fluid 68 in the tank 12 and are further acted upon by the jets 38. Of course, the cleaning fluid 40 within the tank 12 and the cuttings therein are maintained in a sufficiently agitated state to retain the cuttings in suspension and the pump 56 pumps the cleaning fluid 68 from the tank 12 as well as drilling cuttings into the receiving basin 60. The basin 60 is considerably smaller in volume than the tank 12 and thus the cuttings are even more rapidly agitated and more completely retained in suspension and pass evenly to the separator 62. The separator 62 acts to separate the cuttings (cleaned) from the cleaning fluid and the cleaning fluid is returned to the system by way of the tank 14. The pump 46 then pumps the cleaning fluid to the spray jets 38 and 42 and the process is repeated.

Also, because of the pipe 72, if one of the pumps 46 or 56 fails, the remaining operative pump will not run dry, inasmuch as the pipe 72 maintains a substantially constant cleaning fluid level in the tanks 12 and 14.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for washing, cleaning and separating drilling cuttings, said apparatus including separate first and second common elevation cleaning and separating tanks each including a lower sump portion, said tanks having quantities of cleaning fluid therein to a common level, means for discharging a stream flow of cuttings into said first tank, cleaning fluid jet means for causing at least one jet flow of cleaning fluid to laterally impinge upon said stream flow and a plurality of jet flows of cleaning fluid to be generally horizontally discharged in said first at different elevations therein below the cleaning fluid level therein, a foraminated vibratory screen-type separator supported from an upper portion of said second tank, first pump means for pumping cleaning cleaning fluid and cuttings from the sump portion of said first tank to said separator, said separator including means operative to separate liquids and fines from coarse cuttings and to discharge said liquids and fines into said second tank and to discharge said coarse cuttings outwardly of said second tank, second pump means for pumping fluent material from the sump of said second tank to said cleaning fluid jet means, common liquid level maintaining communicating means communicating the interiors of said tanks below said liquid level therein, said means discharging cuttings in said first tank including an inlet conduit laterally into which said one jet flow of cleaning fluid is directed by said cleaning fluid jet means.

2. The apparatus of claim 1 wherein said inlet conduit discharges into said first tank in a downward direction below said desired liquid level therein.

3. The apparatus of claim 1 wherein the upper portion of said second tank includes a receiving basin into which cleaning fluids and cuttings from the sump of said first tank are discharged by said first pump, said receiving basin being of a volume considerably smaller than the volume of said first tank and including an upper weir defining wall portion over which cleaning fluid, fines and course cuttings in suspension in said cleaning fluid flow to said separator.

4. The apparatus of claim 3 wherein said inlet conduit discharges into said first tank in a downward direction below said desired liquid level therein.

* * * * *